UNITED STATES PATENT OFFICE.

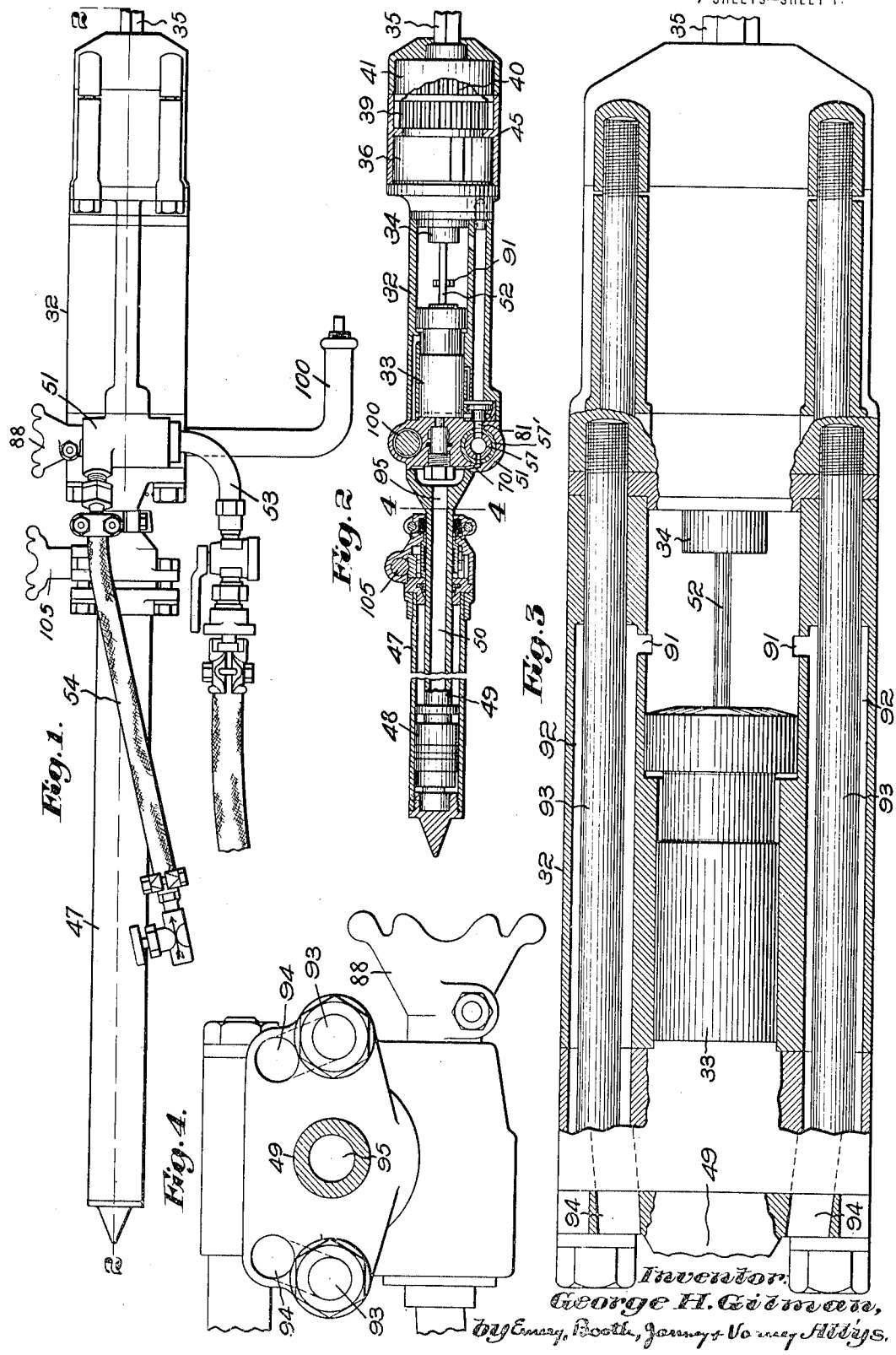

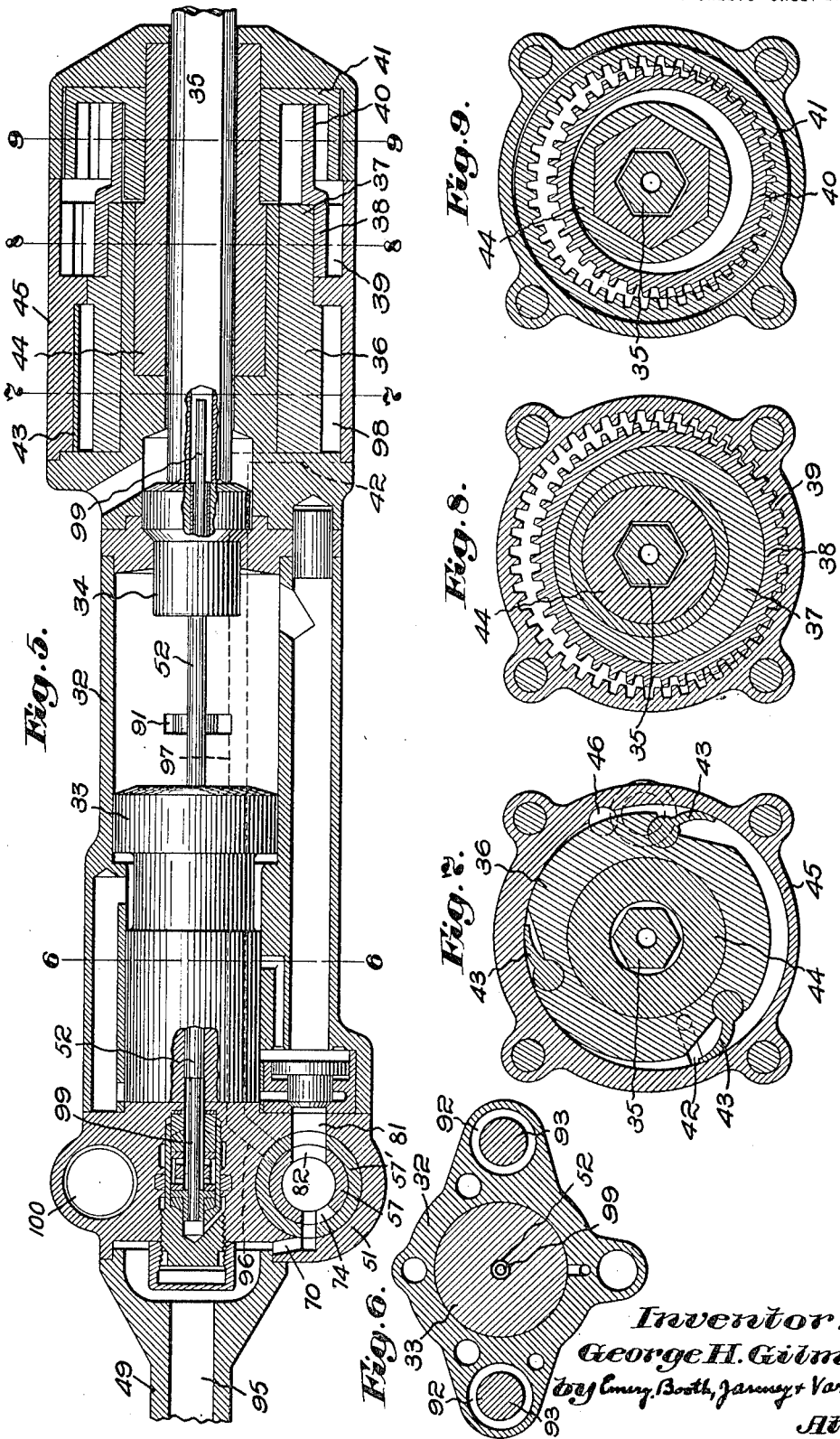

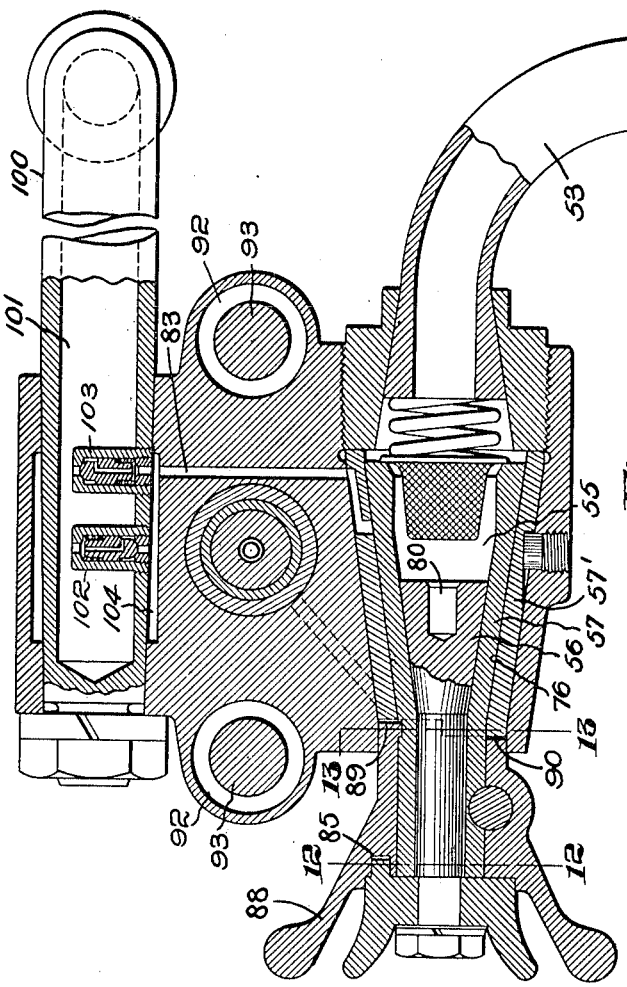
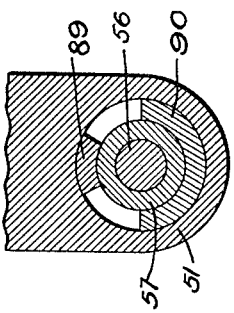
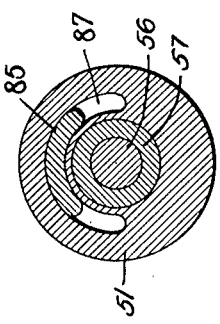
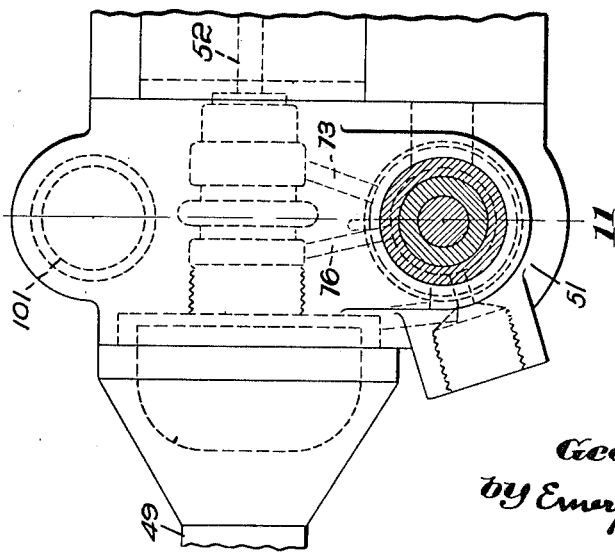

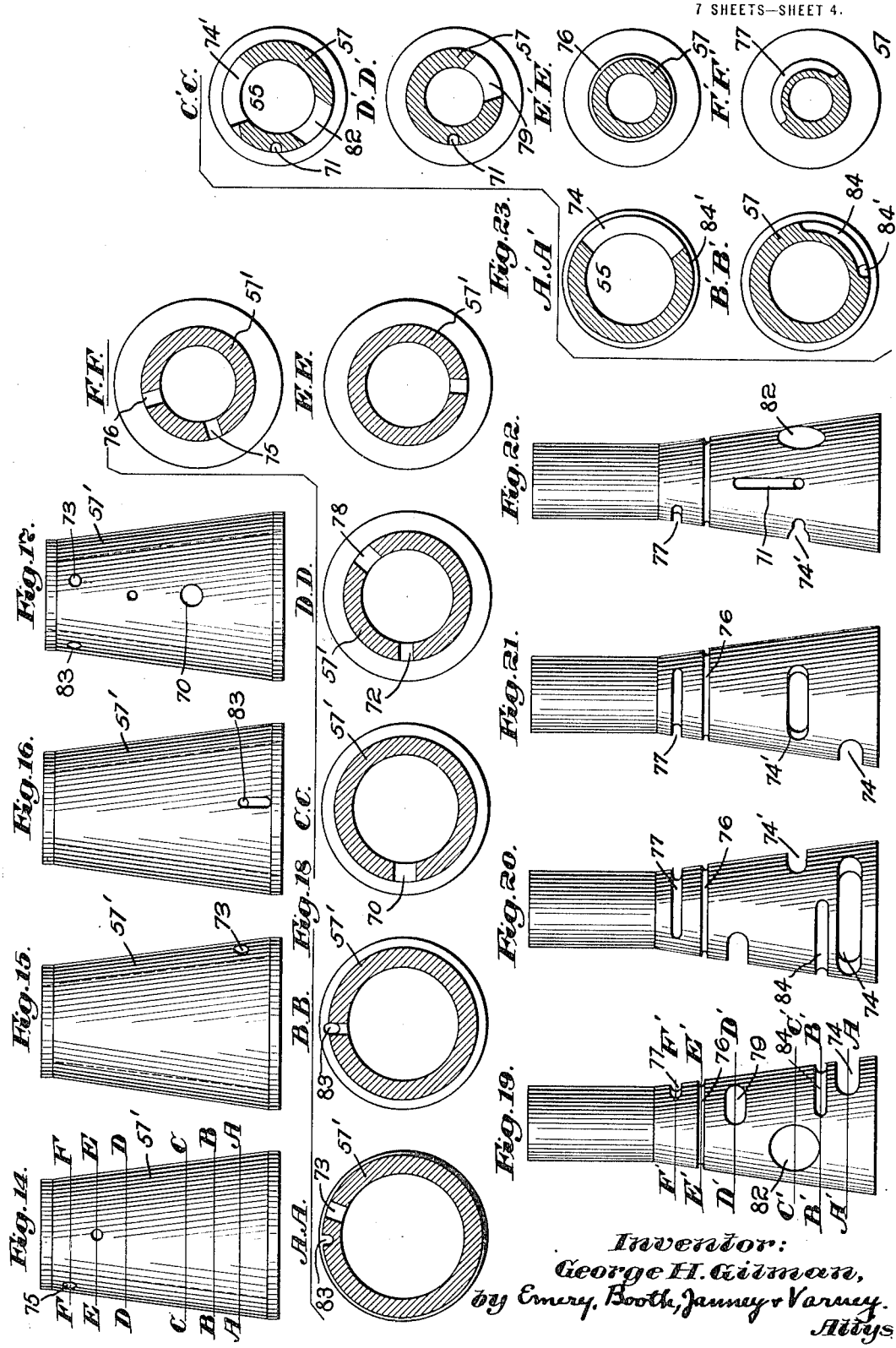

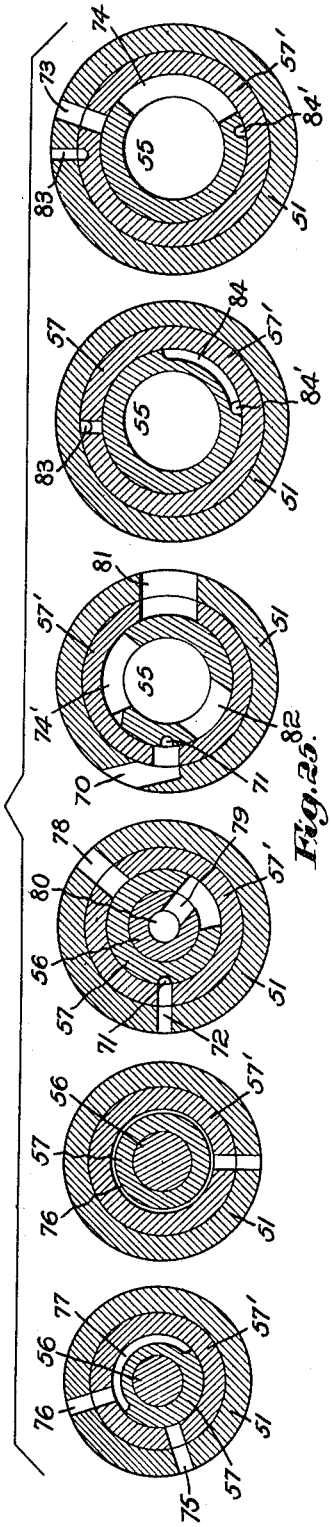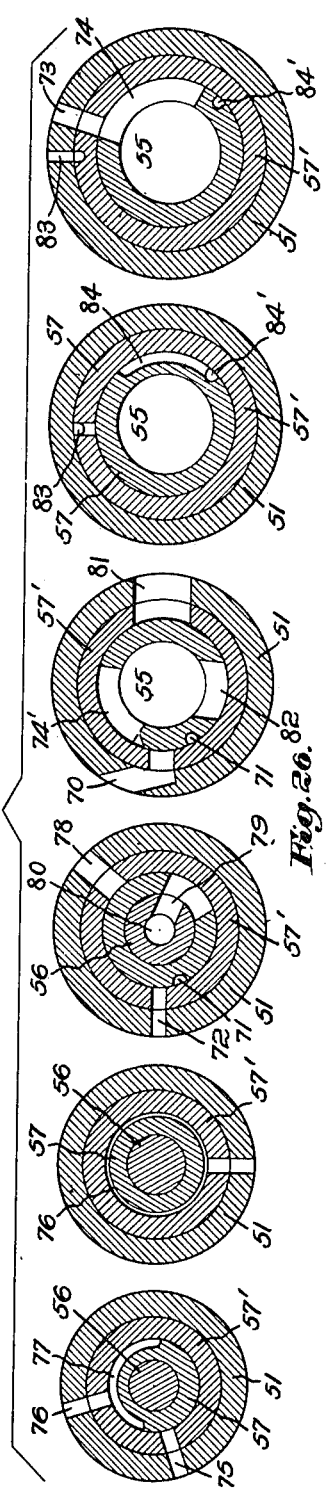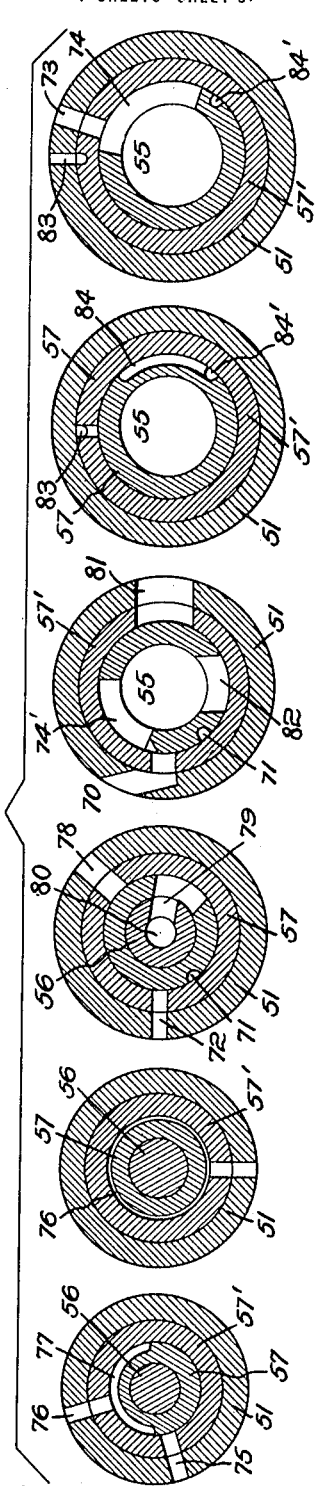

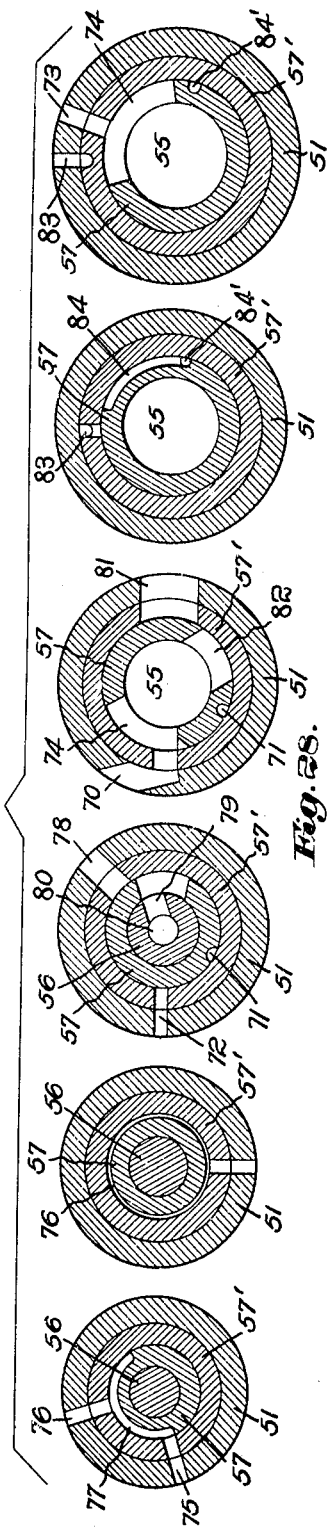
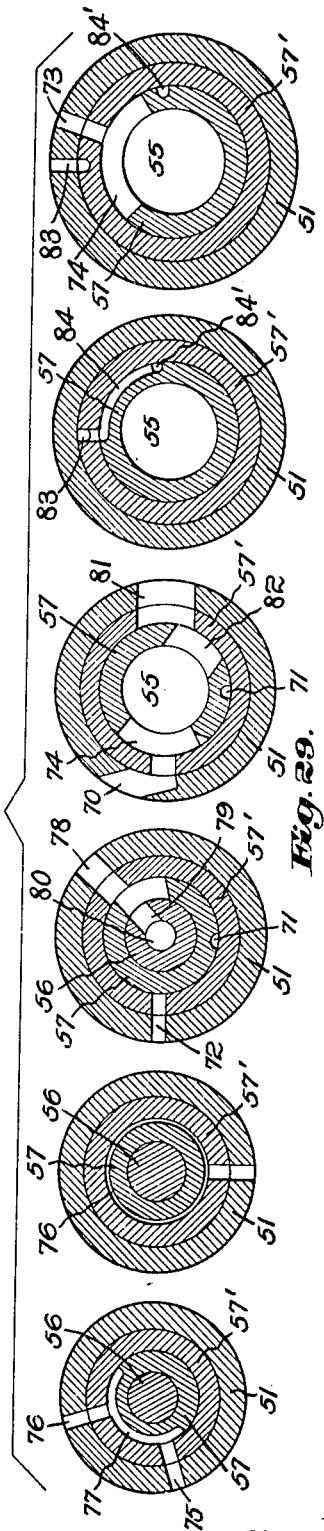
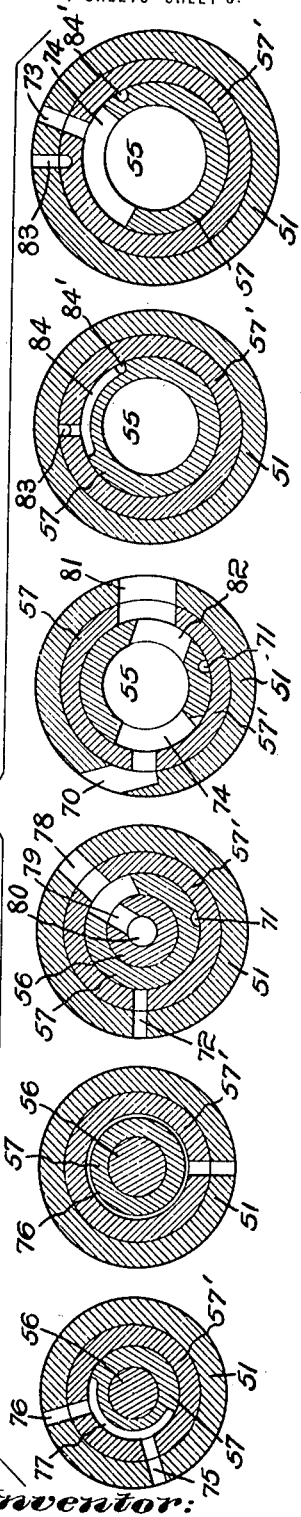

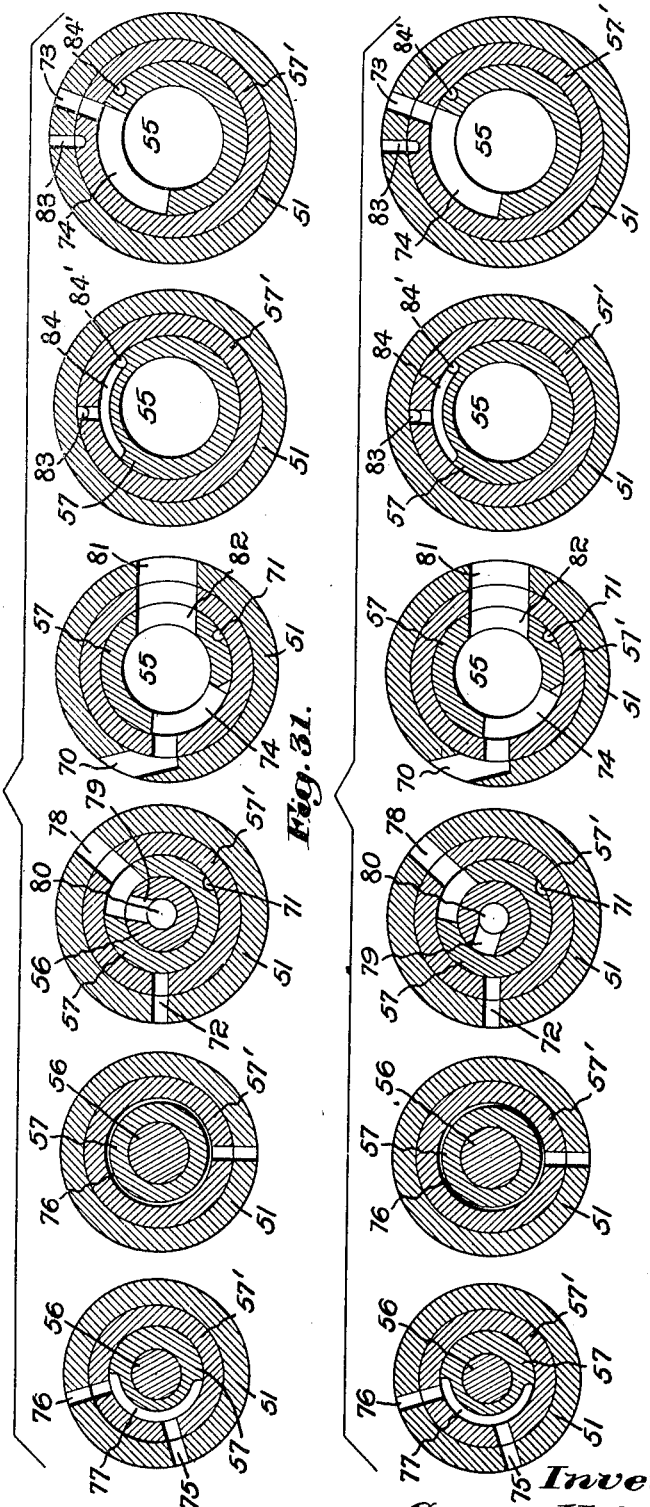

GEORGE H. GILMAN, OF CLAREMONT, NEW HAMPSHIRE, ASSIGNOR TO SULLIVAN MACHINERY COMPANY, OF BOSTON, MASSACHUSETTS, A CORPORATION OF MASSACHUSETTS.

DRILLING APPARATUS.

1,313,859.  Specification of Letters Patent.  Patented Aug. 19, 1919.

Application filed January 3, 1916. Serial No. 69,938.

*To all whom it may concern:*

Be it known that I, GEORGE H. GILMAN, a citizen of the United States, and a resident of Claremont, county of Sullivan, and State of New Hampshire, have invented an Improvement in Drilling Apparatus, of which the following description, in connection with the accompanying drawings, is a specification, like characters on the drawings representing like parts.

My invention pertains to improvements in drilling apparatus and more particularly though not exclusively, to improvements in automatically rotated percussive tools preferably of the pressure fluid actuated, pressure fluid fed type. While my invention is applicable to many types of percussive tools, I have for convenience shown in the drawings a stoping drill provided with a percussive pressure fluid motor of the "semi-valveless" type, drill bit rotating means having an independent motor and epicyclic speed reducing gearing, pressure fluid actuated mill feeding mechanism and a centralized coördinated pressure fluid control system controlling the other elements of the combination. It will be understood that my invention is not limited to the combination above described but may be greatly varied by omission, rearrangement and substitution of elements and by radical changes of methods of operation without departing from the scope of my invention.

Referring to the drawings which show a preferred construction of one illustrative embodiment of my invention—

Figure 1 is a side elevation of a stoping drill;

Fig. 2 is a horizontal section on the line 2—2 of Fig. 1;

Fig. 3 is a section partially in elevation in planes parallel to Fig. 1 with the rotating elements omitted to show the exhaust passages and bolts holding the apparatus together;

Fig. 4 is a section on the line 4—4 of Fig. 2;

Fig. 5 is an enlarged section partly in elevation on the same line as Fig. 2 showing the pressure fluid percussive motor, and drill bit rotating mechanism;

Fig. 6 is a section on the line 6—6 of Fig. 5;

Fig. 7 is a section on the line 7—7 of Fig. 5 showing the drill bit rotating motor;

Figs. 8 and 9 are sections on the lines 8—8 and 9—9 of Fig. 5 showing details of the epicyclic speed reduction mechanism;

Fig. 10 is an enlarged plan of the percussive cylinder head showing details of the cleansing fluid distributing means;

Fig. 11 is a vertical transverse section on the lines 11—11 of Fig. 10 showing portions of the pressure fluid control and distribution system;

Fig. 12 is a section on the lines 12—12 of Fig. 11;

Fig. 13 is a section on the lines 13—13 of Fig. 11.

Figs. 14 through 31, are sections showing details of the pressure fluid control and distribution system to be more fully explained hereafter.

Referring to the drawings and to the preferred construction which I have selected for illustrative and descriptive purposes, in Fig. 2 I preferably provide a percussive fluid motor having a cylinder 32 in which a piston 33 is adapted to reciprocate to impart a rapid series of blows to a striking plug 34 and hence to the drill steel 35. The details of the preferred construction of percussive fluid motor are shown in Fig. 5 and are more particularly described in my co-pending application, Serial No. 69,939, filed Jan. 3, 1916. Referring again to Fig. 5 I prefer to provide drill steel rotating means independent of the percussive motor and for this purpose I may provide a rotary pressure fluid motor 36 (Figs. 5 and 7) preferably surrounding the drill steel 35, as shown, and adapted to impart rotary motion to the drill steel 35 through speed reducing gearing preferably including as shown epicyclic gearing, also preferably surrounding the drill steel 35 which may include, as shown, the eccentric 37 attached to the rotary motor 36 and adapted to impart to a gear 38 a rolling movement about the fixed internal gear 39 (Figs. 5 and 8). It is clear that the eccentric action of the eccentric 37 will impart movement to the axis of the gear 38 in one direction while the meshing of the gear 38 with the fixed internal gear 39 will tend to cause rotation of the gear 38 in a reverse direction as the gear 38 rolls around the interior of the fixed gear 39. The rate of rotation of the gear 38 in proportion to the rate of rotation of the eccentric 37 by the rotary motor 36, will depend on the difference of the numbers of teeth in the gears 38 and 39. For example, if the fixed gear has 24 teeth and the gear to be rotated has 21 teeth there is an excess of three teeth and the rotating gear on each revolution of the eccentric will be moved three teeth on the fixed gear thus making one full revolution in eight revolutions of the eccentric. I preferably provide a gear 40 concentric with and rigidly attached to the gear 38 and preferably provided with a smaller number of teeth. It is clear that the gear 40 will share with the gear 38 its planetary and rotating movements. I may provide an internal gear 41 centered but rotatable about its own axis and adapted to mesh with the gear 40. The gear 40 will thus roll around the interior of the gear 41. If the ratio between the gear 38 and the internal gear 39 were the same as the ratio between the gear 40 and the internal gear 41, it is clear that no movement would be imparted to the last named gear because the gear 40 would roll around the internal gear 41 in the same manner in which the gear 38 rolls around the fixed internal gear 39. If, however, the ratio is changed, movement will be imparted to the gear 41 proportionately to the difference in the ratios. If (as shown) the ratio of gear 39 to gear 38 is greater than the ratio of gear 40 to gear 41, the gear 41 will turn in the same direction as the motor 36 while if the ratios are the reverse, the resultant movement of 41 will be reversed.

The above mechanism constitutes one form of compound epicyclic train with two internal gears to which the following formula applies:

$$\text{R. P. M. of driven gear (41)} = \text{R. P. M. of eccentric} \times \left(1 - \frac{\text{No. teeth in } 39 \times \text{No. teeth in } 40}{\text{No. teeth in } 38 \times \text{No. teeth in } 41}\right)$$

One of the advantages of the preferred construction of drill steel rotating mechanism shown, is that I am enabled to supply a hole passing through some or all of the mechanism for the drill bit 35, so that an exceedingly compact and durable construction is provided. The preferred form of rotary motor 38 (as best shown in Fig. 7) receives fluid pressure through the port 42 which acts against the impellers 43 pivoted on the single rotor 44 which is preferably mounted concentrically with the axis of the drill and through which the drill steel 35 preferably passes. The casing 45 surrounding the rotor 44 is preferably bored eccentrically, as shown, and provided with an exhaust port 46.

The details of construction and operation of the rotary drill rotating motor and of the epicyclic, drill steel surrounding speed reducing gearing, is more fully described in my copending application, Serial No. 69,939, filed Jan. 3, 1916.

As a means of feeding the drill to the work, I may provide, as shown in Figs. 1 and 2, pressure fluid feeding means which may comprise a cylinder 47 and a piston 48, the former preferably adapted to be held stationary relative to the work by any suitable support and the latter preferably being attached to the drill as shown by a piston rod 49. Pressure fluid may be admitted through the port 50 in the piston rod 49 to the rear of the cylinder 47 behind the piston 48 to feed the drilling engine to the work.

I prefer to provide means controllable at will to coördinate at will the admission or exclusion of pressure fluid from some or all of the various instrumentalities comprised in the drilling apparatus. To this end I may, and preferably do provide a controlling valve 51 which may, as shown, control the admission of pressure fluid to the feed cylinder 47, to the drill rotating motor, to the percussive motor, and to the conduit means 52 which may be and preferably is adapted to introduce cleansing fluid, liquid or gaseous, to the work through the drill steel 35 which is preferably provided with a longitudinally extending hole in the well-known manner.

The valve 51 preferably receives pressure fluid from any suitable source through a conduit 53 and may receive any suitable liquid through a conduit 54 (Fig. 1). In the preferred valve construction illustrated, pressure fluid is received in a central opening 55 and from there distributed through ports in a valve mechanism (Fig. 11) which may comprise an inner valve 56 and outer valve 57 turning in any suitable casing such as the bushing 57'. Four elevations of the outer valve seat or bushing 57' are shown in Figs. 14, 15, 16 and 17 while four views of the outer or main controlling valve member 57 are shown in Figs. 19, 20, 21 and 22. The inner valve member 56 and the outer valve member 57 are preferably rotatable relative to each other and to the valve bushing 57', and are provided with ports adapted to register or be out of register in various relative positions of the members before described.

Referring to Figs. 14 and 19, in the preferred construction illustrated, air is supplied to the cleansing tube through ports in the planes marked A and A' on the outer and inner valve shells respectively. Similarly, oil is supplied to the air in the chamber 55 through the ports in the planes B and B'. Pressure fluid is supplied to the feeding mechanism through ports in the planes C and C'. Air is also supplied to the percussive motor through ports in this plane. In the plane D and D' pressure fluid is supplied to the drill steel rotating motor and is exhausted from the feeding mechanism.

In the planes E and E' a leakage port is provided to prevent liquid from passing into the pressure fluid chamber 55.

In the plane F and F' ports are provided to supply water to the tube 52.

The operation and coördination of the various elements of the valve can best be understood by reference to Figs. 24 to 31 in each of which diagrammatic sections are shown through the assembled valve in the planes represented by A, A'; B, B'; C, C'; D, D'; E, E' and F, F' in order from right to left. Each finger represents there six cross sections of the valve in one of the relative positions of adjustment provided by the controlling mechanism.

Referring first to Fig. 24, which is neutral position, all ports are closed except that the passage 70 leading to the feed mechanism is opened by the port 71 communicating with the feed cylinder exhaust passage 72. In Fig. 25 the valve has been turned to its second position thereby closing the feed cylinder exhaust passage 72 and opening the cleansing air inlet passage 73 to the port 74, thus supplying a blast of air to the drill steel 35. In Fig. 26 the valve has been turned farther, leaving the cleansing air inlet passage 73 open and admitting air slowly to the pneumatic feed passage 70 through the port 74'.

In Fig. 27 the valve has been turned farther leaving the passage 73 open, opening wide the passage 70 and admitting water from the water supply passage to the cleansing liquid inlet passage 76 through the port 77, to supply liquid to the drill steel 35.

A further turn of the valve to the position shown in Fig. 28 leaves open all ports and passages open in Fig. 27 and also opens the passage 78 leading to the drill steel rotating motor 36, to the port 79 which communicates through the passage 80 with the main air supply chamber 55 (Fig. 11). In this position a small amount of air is admitted to the percussive tool through the passage 81 by the port 82 and oil is admitted from the oil supply passage 83 to the chamber 55 through the ports 84 and 84'. A further turn of the valve to the position shown in Fig. 29 opens wider the passages 78 and 81 to the percussive tool and drill bit rotating motor.

In Fig. 30 the valve has been turned to open wide all pressure fluid and liquid inlet ports. In this position, therefore, air and water are admitted to the tube 52, air is admitted to the feed cylinder, to the percussive tool and to the drill steel rotating motor while oil is fed to all parts of the machine by being mixed with the air in the chamber 55.

As before stated the rotating motor controlling valve member 56 is movable rotatably within the valve member 57 to permit the stoppage of the pressure fluid supply to the drill steel rotating motor 36 even though the port 79' be in register with the passage 78 (Fig. 31) by rotatably moving the valve member 56 until the port 79 is out of register with the port 79'. To define the movements of the valve member 56 within the valve member 57, I preferably provide (Figs. 11 and 12) a projection 85 on the motor controlling valve handle 86 coöperating with a slot 87 in the main controlling valve handle 88. When the projection 85 abuts one end of the slot 87 the ports 79 and 79' are in register (Fig. 30) while when the projection 85 abuts the other end of the slot 87, the ports 79 and 79' are out of register (Fig. 31).

I prefer that all desired controlling positions of the main controlling valve member 57 be presented by a fraction of a revolution of the main controlling valve handle 88. I preferably provide means to define the movement of the main controlling valve relative to the stationary portion of the valve and to this end I may provide as shown in Figs. 11 and 13, a main valve positioning projection 89 on the main valve handle 88, co-operating with a projection 90 on the bushing 57' the two projections permitting sufficient movement of the main controlling valve handle to permit movement from the neutral position shown in Fig. 24 to the wide open position shown in Fig. 30.

Having thus fully described the controlling valve, I will now describe the preferred construction and location of passages leading from the controlling valve to the various controlled elements.

The passage 81 to the percussive tool is best shown in Fig. 5. The construction and operation of the percussive tool is best described in my copending application Serial No. 69,937, filed Jan. 3, 1916. I prefer that the exhaust from the percussive tool pass from the exhaust ports 91, 91, into annular chambers 92, 92 (Fig. 3) surrounding the side rods 93, 93 and pass rearwardly around such rods to the atmosphere through openings 94 (Figs. 3 and 4). The passage from the controlling valve to the pressure fluid feed is best shown in Fig. 5 wherein the passage 70 connects with the passage 95 in the hollow feed piston rod 49.

The passages to the drill steel rotating motor are also best shown in Fig. 5, the passage 78 connecting with the passages 96 and 97 leading into the drill steel rotating motor chamber 98.

The passages for conducting air and water to the conduit means 52 are best shown in Figs. 5 and 11. In the preferred construction the conduit 52 includes an outer tube for conducting air and an inner tube 99 for conducting water. This construction is of the same general type as is described in my copending application Serial No. 47,570, filed August 27, 1915. Fig. 10 shows the water passage 76 and the air passage 73 leading to the tubes 99 and 52 respectively.

In starting a hole it is frequently desirable to stop the automatic rotation and to hold the drill steel against rotation or to rotate it slowly by hand. The epicylic reduction mechanism is self locking so that it can only be turned by the drill steel rotating motor. Hence I prefer to provide a projecting grip 100 (Figs. 1 and 11) with which the apparatus can be held against rotation or rotated manually as desired. I have found it convenient to provide in the interior of this handle an oil reservoir 101 provided with inlet and outlet check valves 102 and 103 respectively, both connected through a chamber 104 with the oil inlet passage 83 heretofore described. The operation of the controlling valve and apparatus is as follows: Starting in neutral position of the valve (Fig. 24) the first movement of the valve closes the pneumatic feed to the exhaust and admits air to the hole in the drill steel. A further movement to the position shown in Fig. 26 admits pressure fluid to the pneumatic feed to advance the tool to the work and press it against the same. The pressure of the pneumatic feed is preferably controlled by a manually controllable friction feed controlling device 105 similar to the friction controlling device shown in Letters Patent No. 879,020 issued September 14, 1915. A further movement of the valve to the position shown in Fig. 27 admits water to the hollow drill steel.

A further movement of the valve to the position shown in Fig. 28 admits air to the percussive tool, oil to the valve to mix with the pressure fluid for lubrication purposes, and air to the drill steel rotation motor. Further movements to positions shown in Figs. 29 and 30 open wider the port admitting air to the percussive motor.

It will be understood that in Figs. 28, 29 and 30, the operation of the rotating motor is optional, but in the usual practice it will be operated except in starting a hole. The same valve member 56 which permits stoppage of the drill steel rotating motor, may be used by partial rotation to control the speed of the drill steel rotating motor by throttling the supply of air thereto. The apparatus is stopped by reversing the manual movements before described. In this connection it will be noted that the supply of pressure fluid to the hollow drill steel is continued after the supply of water to the drill steel is closed thereby expelling the water from the drill steel and preventing the water from flowing back into the apparatus.

It will be understood that my invention is not limited to the specific elements or combination of elements illustrated and described, but that radical changes involving omission, substitution or rearrangement of elements may be made without departing from the scope of my invention.

The scope of my invention and what I desire by Letters Patent to procure is more particularly pointed out in the following claims:

Claims:

1. Drilling apparatus comprising in combination a drill steel, percussive means, drill steel rotating means independent of said percussive means, and controlling means for coördinately controlling the concurrent admission of pressure fluid to said percussive motor and to said drill steel rotating means, said controlling means including a part normally moving therewith but movable relatively thereto to cut off the supply of pressure fluid to said drill steel rotating means while continuing the supply of pressure fluid to said percussive means.

2. Drilling apparatus comprising, in combination, a drill steel, pressure fluid feeding means therefor, percussive means therefor, a drill steel rotating motor, a throttle valve, a supplementary throttle valve mounted coaxially with said first named throttle valve, and passages coöperating with said valves whereby one controls both said feeding and percussive means and the other controls said rotating motor.

3. Drilling apparatus comprising in combination a drill steel, pressure fluid feeding means, percussive means, a drill steel rotating motor, a throttle valve controlling said feeding means and said percussive means, and a supplementary throttle valve mounted coaxially with said first named throttle valve for controlling the operation of said drill steel rotating motor, and means whereby said supplementary throttle valve may be operable by movement of said first named throttle valve or without movement of said first named throttle valve.

4. Drilling apparatus comprising in combination a drill steel, pressure fluid feeding means, percussive means, a drill steel rotating motor, a throttle valve controlling said feeding means and said percussive means, and a supplementary throttle valve mounted within said first named throttle valve for controlling the operation of said drill steel rotating motor.

5. Drilling apparatus comprising in combination a drill steel, pressure fluid feeding means, percussive means, a drill steel rotating motor, a throttle valve controlling said feeding means and said percussive means, and a supplementary throttle valve mounted coaxially with said first named throttle valve for controlling the operation of said drill steel rotating motor, said supplementary throttle valve normally turning with said first named throttle valve.

6. Drilling apparatus comprising in combination a drill steel, pressure fluid feeding means, percussive means, a drill steel rotating motor, a throttle valve controlling said feeding means and said percussive means, and a supplementary throttle valve mounted within said first named throttle valve for controlling the operation of said drill steel rotating motor, said supplementary throttle valve normally turning with said first named throttle valve.

7. In a pressure fluid drilling apparatus, a drill steel, feeding means therefor, percussive means therefor, a drill steel rotating motor, a throttle valve coördinately controlling said feeding and percussive means, a supplementary coaxially disposed throttle valve for controlling the operation of said rotating motor, said last named valve normally turning with said first named valve, and means whereby said valves may be independently operated.

8. In a pressure fluid drilling apparatus, a drill steel, feeding means therefor, percussive means therefor, a drill steel rotating motor, a throttle valve coördinately controlling said feeding and percussive means and said rotating motor, and a supplementary independently movable throttle valve for controlling the operation of said rotating motor independently of said feeding means and percussive means.

9. In a pressure fluid drilling apparatus, a drill steel, feeding means therefor, percussive means therefor, a drill steel rotating motor, a throttle valve coördinately controlling said feeding and percussive means and said rotating motor, and a supplementary independently movable throttle valve for varying the pressure fluid supply to said rotating motor independently of said feeding means and percussive means.

10. In a pressure fluid drilling apparatus, a drill steel, feeding means therefor, percussive means therefor, a drill steel rotating motor, a throttle valve controlling said feeding and percussive means and said rotating motor, and a supplementary throttle valve mounted coaxially with said first named throttle valve and movable independently thereof to cut off the supply to said rotating motor.

11. In a pressure fluid actuated drilling apparatus, a drill steel, feeding means therefor, percussive means therefor, a drill steel rotating motor, and coördinated controlling means for said several means including a rotatable throttle valve and a coöperating throttle valve, each controlling the operation of said rotating motor and one effective in predetermined positions relative to the other.

12. In a pressure fluid actuated drilling apparatus, a hollow drill steel, feeding means therefor, a drill steel rotating motor, means for supplying gaseous fluid to said steel, and reversible coördinated controlling mechanism for said feeding and percussive means and said rotating motor operative as a unit for initially supplying pressure fluid to said drill steel and thereafter to said instrumentalities, said mechanism maintaining said supply to said drill steel after the supply to said other instrumentalities has been cut off.

13. In a pressure fluid actuated drilling apparatus, a hollow drill steel, feeding means therefor, percussive means therefor, a drill steel rotating motor, means for supplying gaseous fluid and a liquid to said steel, and coördinated controlling mechanism for said several means operative as a unit to admit gaseous fluid to said drill steel and thereafter to admit liquid to said drill steel and fluid to said other instrumentalities.

14. In a pressure fluid actuated drilling apparatus, a hollow drill steel, feeding means therefor, percussive means therefor, a drill steel rotating motor, means for supplying gaseous fluid and a liquid to said steel, and reversible coördinated controlling mechanism for said several means operative as a unit for initially supplying gaseous fluid to said drill steel and thereafter supplying liquid to said drill steel and fluid to said other instrumentalities, said mechanism cutting off said supply of gaseous fluid to said drill steel after the supply of liquid is cut off.

15. Drilling apparatus comprising, in combination, a drill steel, pressure fluid feeding means, percussive means, a drill steel rotating motor, a throttle valve controlling said feeding means and said percussive means, a supplementary throttle valve mounted within said first named throttle valve for controlling the operation of said drill steel rotating motor, controlling means for said first named valve, and controlling means for said supplementary valve partially concealed by said first named controlling means.

16. Drilling apparatus comprising, in combination, a drill steel, pressure fluid feeding means, percussive means, a drill steel rotating motor, a throttle valve controlling said feeding means and said percussive means, a supplementary throttle valve mounted coaxially with said first named throttle valve for controlling the operation of said drill steel rotating motor, said supplementary throttle valve normally turning with said first named throttle valve, and an independent protected controlling means for the supplementary throttle valve.

17. Drilling apparatus comprising, in combination, a drill steel, pressure fluid feeding means, percussive means, a drill steel rotating motor, a throttle valve controlling said feeding means and said percussive means, and a supplementary throttle valve for controlling the operation of said drill steel rotating motor, said supplementary throttle valve frictionally engaging said first named throttle valve and normally turning therewith.

18. In a drilling apparatus comprising a drill steel, percussive means, drill rotating means, and passageways for conducting pressure fluid to the several means, a throttle valve for controlling the flow of pressure fluid therethrough in a predetermined sequence, a supplemental valve coöperating therewith for controlling the flow to one of said passageways, and a protected controlling means for said supplemental controlling valve.

In testimony whereof I have signed my name to this specification in the presence of two subscribing witnesses.

GEORGE H. GILMAN.

Witnesses:
 DOUGLAS N. BARCLAY.
 WILLIAM BARCLAY.